(12) United States Patent
Ashani

(10) Patent No.: US 9,852,019 B2
(45) Date of Patent: Dec. 26, 2017

(54) SYSTEM AND METHOD FOR ABNORMALITY DETECTION

(71) Applicant: Agent Video Intelligence Ltd., Rosh HaAyin (IL)

(72) Inventor: Zvika Ashani, Ganey Tikva (IL)

(73) Assignee: AGENT VIDEO INTELLIGENCE LTD., Rosh Haayin (IL)

( * ) Notice: Subject to any disclaimer, the term of this patent is extended or adjusted under 35 U.S.C. 154(b) by 95 days.

(21) Appl. No.: 14/899,276

(22) PCT Filed: Jun. 9, 2014

(86) PCT No.: PCT/IL2014/050514
§ 371 (c)(1),
(2) Date: Dec. 17, 2015

(87) PCT Pub. No.: WO2015/001544
PCT Pub. Date: Jan. 8, 2015

(65) Prior Publication Data
US 2016/0139977 A1     May 19, 2016

(30) Foreign Application Priority Data
Jul. 1, 2013   (IL) .......................................... 227277

(51) Int. Cl.
*G06F 11/00*     (2006.01)
*G06F 11/07*     (2006.01)
(Continued)

(52) U.S. Cl.
CPC ...... *G06F 11/0772* (2013.01); *G06F 11/0706* (2013.01); *G06F 11/079* (2013.01);
(Continued)

(58) Field of Classification Search
CPC ............. G06F 11/0706; G06F 11/0751; G06F 11/0772; G06F 11/079; G06K 9/00771; G06K 9/6282; G06N 3/0454; G06N 3/08
See application file for complete search history.

(56) References Cited

U.S. PATENT DOCUMENTS 6,144,952 A  *  11/2000   Keeler ................. G06N 3/0472
                                                        706/21
6,754,380 B1     6/2004   Suzuki et al.
(Continued)

OTHER PUBLICATIONS

George D. C. Cavalcanti et al: "MLPBoost: A combined AdaBoost / multi-layer perception network approach for face detection", 2012 IEEE International Conference on Systems, Man, and Cybernetics (SMC), Oct. 17, 2012 (Oct. 17, 2012), pp. 2350-2353, XP055168438, DOI: 10.1109/ICSMC.2012.6378093 ISBN: 978-1-46-731712-2.

(Continued)

*Primary Examiner* — Joshua P Lottich
(74) *Attorney, Agent, or Firm* — Arent Fox LLP; Michael Fainberg

(57) ABSTRACT

A system and method for use in data analysis are provided. The system comprises a data processing utility configured to receive and process input data, comprising: plurality of neural network modules capable for operating in a training mode and in a data processing mode in accordance with the training; a network training utility configured for operating the neural network modules in the training mode utilizing selected set of training data pieces for sequentially training of the neural network modules in a cascade order to reduce an error value with respect to the selected set of the training data pieces for each successive neural network module in the cascade; and an abnormality detection utility configured for sequentially operating said neural network modules for processing input data, and classifying said input data as (Continued)

abnormal upon identifying that all the neural network modules provide error values being above corresponding abnormality detection thresholds.

5 Claims, 5 Drawing Sheets

(51) Int. Cl.
| | | |
|---|---|---|
| *G06N 3/04* | (2006.01) | |
| *G06K 9/00* | (2006.01) | |
| *G06K 9/62* | (2006.01) | |
| *G06N 3/08* | (2006.01) | |

(52) U.S. Cl.
CPC ...... *G06F 11/0751* (2013.01); *G06K 9/00771* (2013.01); *G06K 9/6282* (2013.01); *G06N 3/0454* (2013.01); *G06N 3/08* (2013.01)

(56) References Cited

U.S. PATENT DOCUMENTS

| | | | |
|---|---|---|---|
| 7,152,051 B1 | 12/2006 | Commons et al. | |
| 8,306,931 B1 | 11/2012 | Bowman et al. | |
| 8,346,691 B1* | 1/2013 | Subramanian | G06N 3/08 706/12 |
| 2004/0247177 A1* | 12/2004 | Rowe | G06K 9/00288 382/159 |
| 2005/0147291 A1* | 7/2005 | Huang | G06K 9/6282 382/159 |
| 2009/0043722 A1* | 2/2009 | Nugent | G06N 3/08 706/25 |
| 2009/0141969 A1* | 6/2009 | Yu | G06N 3/08 382/157 |
| 2009/0324010 A1* | 12/2009 | Hou | G06K 9/00771 382/103 |
| 2013/0266193 A1* | 10/2013 | Tiwari | G06K 9/00771 382/115 |
| 2014/0164299 A1* | 6/2014 | Sainath | G06N 3/08 706/16 |
| 2014/0300758 A1* | 10/2014 | Tran | H04N 5/225 348/207.1 |

OTHER PUBLICATIONS

Conk Kaynak et al: "MultiStage Cascading of Multiple Classifiers: One Man's Noise Is Another Man's Data", Jul. 2, 2000 (Jul. 2, 2000), XP055168450, Retrieved from the Internet: URL:http://citeseerx.ist.psu.edu/viewdoc/download?doi=10.1.1.17.4851&rep=repl&type=p df [retrieved on Feb. 9, 2015].

Viola P et al: "Fast and Robust Classification using Asymmetric AdaBoost and a Detector Cascade", Advances in Neural Information Processing Systems, Morgan Kaufmann Publishers, Inc., US vol. 14 Dec. 14, 2001 (Dec. 14, 2001), pp. 1-6, XP008102087, ISSN: 1049-5258.

International Search Report dated Feb. 17, 2015.

\* cited by examiner

SYSTEM AND METHOD FOR ABNORMALITY DETECTION

TECHNOLOGICAL FIELD AND BACKGROUND

The present invention is in the field of data analysis and relates to detection of abnormalities in a data stream. The invention is particularly useful in video analysis systems where there is a need to detect abnormal behavior of objects (e.g. people or vehicles) in a region of interest.

Analysis of data in different fields includes various tasks and techniques. Many applications aim at identifying data pieces, e.g. indicating certain events or objects in a region of interest, and enabling the system (or a user) to decide whether a certain data piece is to be classified as normal or abnormal with respect to a standard behavior under the observed conditions. For example, most video analytics systems analyze existence of objects in the video frame utilizing certain rules which typically require a priori knowledge of types of events which are abnormal in the scene. Such data analysis systems may require different types of set of rules, but are generally incapable of automatically generating the set of rules based on observed behavior of the sample data to be analyzed.

GENERAL DESCRIPTION

There is a need in the art for a novel technique for effective detection of abnormalities in a data stream. Detection of abnormal data pieces may be required for various applications such as video surveillance, quality assurance processes, search algorithms and various other data processing applications.

The present invention provides a novel technique of the kind specified capable of working with large data sets including multiple clusters of similar, or almost similar, data pieces for detecting abnormal data pieces therein. The technique of the present invention is able to determine accurately whether a certain data piece belongs to a cluster which has been learned during a learning/training mode, even in cases where there are very large differences in the cluster sizes.

To this end, the technique of the present invention may utilize one or more modules (e.g. neural network modules (NNM)), each configured and operable to undergo appropriate training, and once trained, each is operable to properly define a behavior map for detecting abnormal input data pieces. The one or more modules are typically configured to be trained and operated sequentially, in a cascade fashion, such that each module is trained and operated based on the data pieces which have been classified as abnormal by the preceding module(s).

Additionally, the present invention provides a unique thresholding technique enabling accurate abnormality detection for control over a certain number of detected abnormal data pieces. The thresholding technique may utilize statistical parameters of input data pieces, as well as flow rate of input data to determine an abnormality threshold to be used by at least one of the modules, and preferably all of the modules in the cascade. For example, the system may be configured to generate a desired rate of abnormality alerts to thereby avoid alarm overflowing, e.g. 2-20 alert per day. To this end the abnormality detection system may set an appropriate abnormality detection threshold in accordance with the desired average (or maximal) alerts per day and an average input rate of data pieces.

The technique of the present invention relies on the inventors' understanding that most alert raising events are statistically different from typical behavior of data/objects. Clustering sufficient amount of data pieces may thus provide statistical indication regarding normal or abnormal data pieces. Generally, most data pieces fall into well-established clusters, while abnormal data pieces are generally relatively unique and do not fall into such clusters.

Generally, the technique of the present invention may be used for detecting abnormal behavior of objects (e.g. people, vehicles) detected in a video stream. In this connection it should be noted that the term data piece as used herein typically refers to an object instance as observed in a region of interest and may be represented by a vector including certain data fields. In video surveillance applications, these data fields describe parameters of an object instance, such as time of instance and one or more other parameters relating to the object itself. More specifically, an object may be a car or a person located in the region of interest (ROI), while an object instance may include the location of the object at a certain time in a certain position within the ROI.

It should be noted that since the object may be located within the ROI for a long time, an object detection system may generate object instances describing the object's location and behavior at different points in time. For example, the object detection system may generate data pieces describing a certain object in the ROI in predetermined time intervals (e.g. every 5 or 10 seconds). Such data pieces describing an object instance may generally include parameters such as time of instance, location in the ROI, speed of the object's movement, and/or physical parameter of the object such as color, size, etc. Additional data, such as tags assigned to certain known objects, may also be a part of the generated object instances.

The technique of the invention is based on training the one or more neural network modules on a set of data pieces representing objects' behavior in the ROI for a selected training period. Once the system is trained, it is capable of automatic detection of abnormal events (e.g. in the objects' behavior) in the ROI. Upon detecting one or more abnormal events, the system generates an appropriate alert.

The technique of the present invention utilizes a unique neural network architecture, which may utilize a novel thresholding technique, for detection of abnormal data pieces in a data stream, e.g. video fragment. As indicated above, the system of the present invention is configured and operable to execute a training mode to process data pieces of the required type in order to provide reliable abnormality detection of "real" data stream. To this end, the system is typically a computer system comprising inter alia a data processing utility, which may comprise, or be configured to communicate with, one or more neural network modules (NNM) which may generally be a replicator type neural network. It should be noted however that any type of neural imitating calculation system capable of unsupervised learning may be used.

Each of the neural network modules is capable to operate in at least a training mode and a data processing mode. Operation of the NNM in the training mode typically comprises adjusting internal computing links within the network in accordance with a training data set to comply with a desired output for different input data pieces. The operation of the NNM in the data processing mode includes processing unknown data pieces in accordance with the training of the network, and determining and analyzing variations between the input data and the output data resulting from said processing. Under the assumption that the network is trained to detect abnormal data pieces, an error value or distance between the desired output and the actual output provided by the NNM may assist in classifying said input data piece as normal or abnormal with respect to the training.

The processing utility may also comprise a network training utility (NTU) which is connectable to each neural network module. The network training utility is configured to operate the one or more neural networks on their training mode with respect to a training data set comprising a certain number of data pieces collected during a training period. Generally, the network training utility (NTU) operates to feed the neural network under training with input data pieces from a set of data pieces representing the training period, where this set of data pieces preferably represents statistical variations of data behavior in the circumstance where the system is to operate (e.g. behavior of objects in the ROI). For example, in the field of video analysis, the training set of data pieces may be a set of object instances as detected by a video processing utility, as described above, during a predetermined training period (e.g. observing the scene and collecting data therefrom during one or two weeks). It should be noted that the video processing utility may or may not be a part of the abnormality detection system of the invention, and is exemplified therein as a source for appropriate data pieces to be further used by the abnormality detection system of the invention.

Generally, the network training utility (NTU) may operate to provide data pieces of the training data set to the neural network module, and to operate the NNM in its training mode in accordance with any suitable training algorithm, e.g. back propagation training algorithm. Typical training algorithms utilize a known set of training data pieces and a corresponding set of known output data pieces, and are configures to vary internal connections within the NNM such that processing of input data pieces provides the desired corresponding output data. In the case of replicator type neural network, the training of the NNM is aimed at providing the network's output to be as close as possible to the corresponding input data piece. The back propagation algorithm for neural network training is an iterative process in which the connections between the network nodes are given some random initial values, and the network is operated to calculate corresponding output vectors for a set of input vectors (the training data set). The output vectors are compared to the desired output of the training data set (for a replicator type network the desired output is typically the input vectors) and the error between the desired and actual output is calculated. The calculated error is propagated back from the output nodes to the input nodes and is used for modifying the values of the network connection weights in order to decrease the error. After each such iteration the NTU may calculate a total error for the entire training set and repeats the process with another iteration. The training of the NNM is complete when the total error reaches a minimum value. If a minimum value of the total error is not reached after a predetermined number of iterations and if the total error is not a constant the NTU considers that the training process does not converge.

When the training of each neural network module is complete, the network training utility may operate to verify/evaluate the training of the NNM, and in some embodiments, where the system is configured with more than a single NNM, to select a training data set for the additional (cascaded) NNM. To this end, the NTU may input the complete set of training data pieces to the already trained NNM for calculating, for each data piece, an error value between the output vector and the corresponding input data piece (input vector). The data pieces with relatively high error value will be selected to form an additional training data set, which is used to train the subsequent NNM of the system in a similar manner.

Generally, the NTU operates to manage the training mode for the NNM, namely train the NNM based on a first training data set, verify the training of said NNM, and generate accordingly a second training data set for training of a subsequent NNM. Then, the NTU operates to train the subsequent NNM, verify its training, and generate accordingly an additional training data set for a next NNM, and so on. Hence, the NTU operates to manage the training of all of the NNMs in a cascade order. The training sequence of NNMs may be considered as complete if any one of the following conditions is met: (i) all the available NNMs are properly trained as noted above; (ii) the training process of any one of the NNMs in the cascade does not converge as described above; or (iii) the training data set includes number of data pieces below a predetermined threshold (e.g. a training data set which includes less than a hundred data pieces).

When the training of the cascade of NNMs is complete, the system is ready to operate for detecting abnormalities in input data pieces. However, to provide reliable results, the system may be configured for periodic training based on data collected during operation.

The abnormality detection system typically also includes an abnormality detection utility (ADU), which is connectable to each NNM and configured to operate the NNM(s) to detect whether a certain input data piece is normal under the circumstance for which the system has been trained. The ADU typically receives an input data piece and operates the one or more NNMs in a cascade order to detect whether said input data piece is normal or abnormal based on the training of the system. According to some embodiments, the ADU is configured to receive a stream of data pieces, at a certain range of flow rates, and operates the NNM(s) of the system to detect abnormal data pieces in the input stream.

Additionally, the flow rate of data pieces may further be used to determine an abnormality threshold to thereby enable statistical control over a rate of abnormality alerts raised by the system. More specifically, according to some embodiments, if an error value corresponding to a difference between an input data piece and its corresponding output (resulting from the processing of the input data by certain NNM(s)) exceeds the corresponding abnormality threshold, the data piece is generally considered abnormal.

According to some embodiments of the invention, the ADU receives an input data piece, which may be one of a stream of data pieces, and inputs the data piece to an NNM to be processed. The NNM processes the data piece and generates a corresponding output vector in response. The ADU may then operate to calculate an error value between the input data piece and the output vector and compare it to a corresponding abnormality threshold. The abnormality thresholds are generally associated with the NNMs, respectively, and may be determined in accordance with a flow rate of input data pieces and/or in accordance with the type of processing. If the error value is found to be below the corresponding threshold, or within the thresholding limits, the data piece is considered as normal and may not be further analyzed for abnormality. If the error value exceeds the threshold, the abnormality detection processing would continue by a subsequent NNM. The ADU may then continue to input said data piece sequentially down the cascade of NNMs in a similar manner until the error value resulting from processing of the data piece by one of the NNMs in the sequence renders the data piece as normal. If the error value resulting from processing of the last NNM of the cascade (i.e. after being processed by all of the NNMs in the cascade) is still above the corresponding abnormality threshold, the data piece is considered as abnormal and appropriate alert may be raised.

Thus, according to one broad aspect of the present invention a system for use in data analysis is provided. The system comprising a data processing utility configured to receive and process input data, the data processing utility comprising:

- a plurality of neural network modules each configured and operable to operate in a training mode to undergo training and in a data processing mode for processing one or more input data pieces in accordance with said training;
- a network training utility connected to each of the neural network modules, the network training utility being configured for operating each of the neural network modules in the training mode by applying a selected set of training data pieces, wherein said network training utility being configured for sequentially training the neural network modules in a cascade order to thereby reduce an error value with respect to said selected of the training data pieces for each successive neural network module in the cascade;
- an abnormality detection utility connected to each of the neural network modules, the abnormality detection utility being configured and operable for sequentially operating said neural network modules for successively processing the input data, and upon identifying that all of said neural network modules provide the error values being above corresponding abnormality detection thresholds, classifying said input data as abnormal thereby enabling generation of an alert.

According to some embodiments the system further comprising a data selection utility having data input port for receiving the input data and data output ports connected to inputs of the network training utility and the abnormality detection utility. The data selection utility is configured for appropriately selecting data pieces associated with a training data set, and for scaling the input data in accordance with statistical parameters thereof, thereby enhancing efficiency of said neural network modules. The network training utility may be configured and operable for calculating the error value for each of the neural network modules in accordance with one or more statistical operational parameters of the corresponding neural network module. More specifically, the network training utility may calculate the error value in accordance with standard deviation of differences between input and output data pieces in a predetermined input data.

According to some embodiments of the inventions, the abnormality detection system comprises a thresholding utility connectable to said plurality of NNMs and configured to receive output vectors therefrom and to calculate said error value. The thresholding utility is configured to determine said abnormality detection threshold corresponding to each of said NNMs. The abnormality detection threshold for each of the NNMs may be determined in accordance with a flow rate of data pieces being input to the system.

According to some embodiments of the invention, at least one of the neural network modules is a replicator type neural network module. Generally, two or more of the NNMs are replicator type neural network modules.

According to some embodiments, the abnormality detection system of the present invention is configured for use in abnormality detection in an image stream; the input data may thus be indicative of one or more object instances detected in the image stream. The input data may comprise data parameters associated with at least one of the following: time of instance, type of object, size of object, location in a region of interest and speed of object.

According to one other broad aspect of the present inventions, there is provided a method for use in abnormality detection. The method comprising:

providing a plurality of neural network modules;

sequentially training said multiple neural network modules in a cascade order with respect to a set of training data pieces to thereby reduce an error value for each successive neural network module, thereby minimizing an error value with respect to said training data pieces for each successive neural network module in the cascade.

According to yet another broad aspect, the present invention provides a method for use in abnormality detection. The method comprising: receiving a first set of calibration data pieces and generating therefrom a first normal behavior map corresponding to said first set of calibration data; determining a second set of calibration data pieces which includes calibration data pieces of said first set of calibration data pieces being outside of said first normal behavior map; using said second set of calibration data pieces and generating a corresponding second normal behavior map corresponding to said second set of calibration data; and determining a third set of calibration data pieces including calibration data pieces being outside of said second normal behavior map; The method is configured for repeating the process until number of calibration data pieces in a newly generated set satisfies at least one of the following: the number equals to number of calibration data pieces in previous set, or the number is below a predetermined threshold.

According to some embodiments, the method comprises producing, for each set of calibration data pieces, a corresponding set of input vectors and scaling the set of input vectors with respect to mean and standard deviation values of at least one parameter of said input vectors.

The method may also comprise: receiving input data pieces in which abnormalities are to be detected, comparing said input data pieces to the first normal behavior map and classifying said input data pieces as either normal or abnormal with respect to said first behavior map, and electively applying a comparison step to the abnormal data pieces. the selective comparison step comprising comparing the abnormal input data pieces to the second behavior map to further classify said abnormal input data pieces as either normal or abnormal with respect to the second behavior map, and repeating the selective comparison step until all the input data pieces are classified as normal, and upon identifying that there exist at least one input data piece classified as abnormal with respect to all behavior maps, generating data indicative of said at least one abnormal input data piece. The generation of a normal behavior map may comprise utilizing a neural network based on a set of data pieces. The data pieces may comprise object related data pieces, generated from an image stream.

According to yet another broad aspect of the present invention there is provided a video surveillance system comprising a processing unit. The video surveillance system is connectable to one or more imagers for receiving image data indicative of a region of interest. The processing unit comprises an object detection utility and an abnormality detection utility; the object detection utility is configured and operable for receiving input data indicative of imaged data of the region of interest, detect foreground objects is said image data and periodically generate one or more object instances being indicative of detected foreground objects, the object detection utility is configured to transmit said object instances to the abnormality detection. The abnormality detection utility is configured for receiving said object instances from the object detection utility and for processing said object instances in accordance with either a training mode and an abnormality detection mode; in the training mode the abnormality detection utility operates to learn behavior of objects in the region of interest, and in the abnormality detection mode the abnormality detection utility is operable to detect abnormal behavior of objects and to generate accordingly an appropriate alert.

BRIEF DESCRIPTION OF THE DRAWINGS

In order to better understand the subject matter that is disclosed herein and to exemplify how it may be carried out in practice, embodiments will now be described, by way of non-limiting example only, with reference to the accompanying drawings, in which.

DETAILED DESCRIPTION OF EMBODIMENTS

The present invention provides a technique for use in detection of abnormal data pieces. Generally the technique may be used in detection of abnormal events in a video stream. However, it should be noted that the technique of the present invention is not limited to this specific application, and the principles of the invention may be used in various other applications dealing with detection of data pieces which are, at least statistically, abnormal with respect to normal behavior of corresponding data. The technique of the present invention may be implemented as a software product embedded in a computer readable medium and configured to be executed by a computer system, and/or directly embedded in a computer system having input and output utilities, storage utility and a processor utility.

Figure 1:
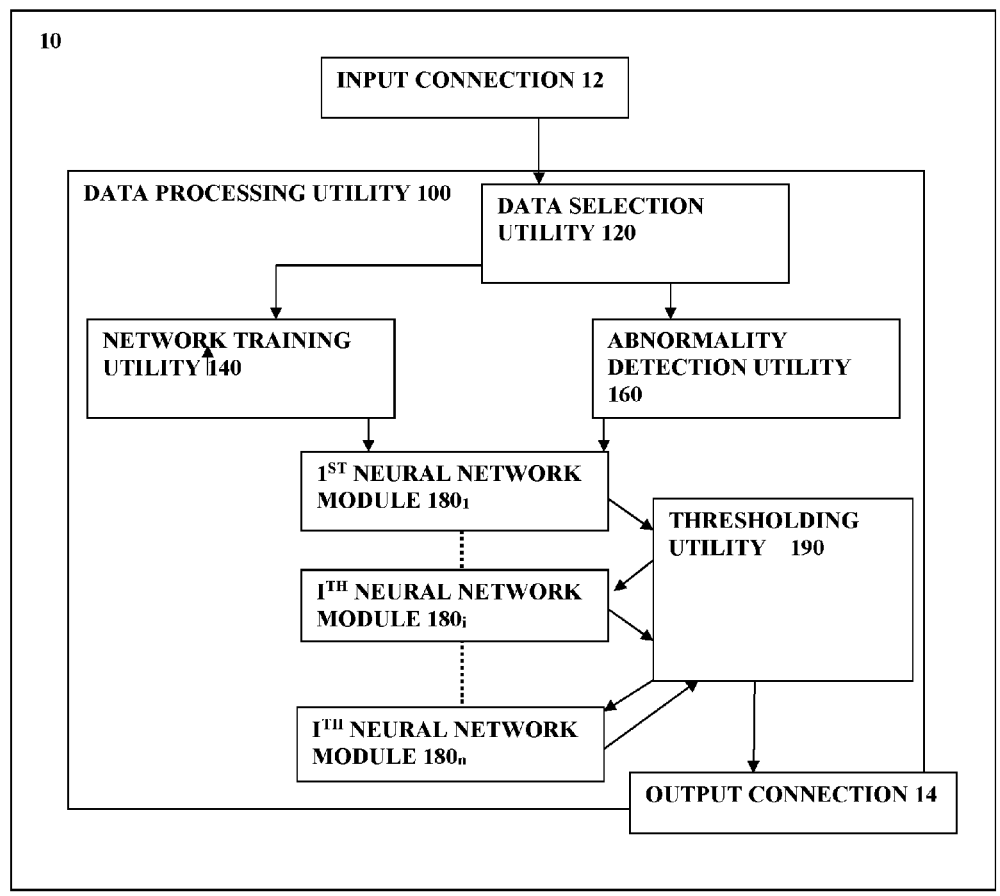
FIG. 1 illustrates schematically an abnormality detection system according to some embodiments of the present invention.

Reference is made to FIG. 1 exemplifying a system 10 of the invention for use in data analysis and specifically for abnormality detection in data stream. The system 10 may generally be a part of a server system configured for data processing (e.g. a video surveillance server configured for processing of image stream, detecting object, and following object's behavior to detect abnormal behavior and raise appropriate alarms) and/or may be a stand-alone computing system configured to receive input data via an appropriate data communication port, e.g. connectable to a communication network.

The abnormality detection system 10 typically includes data communication utilities such as input 12 and output 14 ports, a data processing utility 100, as well as data storage utility which may be connected to the system via the data communication port and is thus not specifically shown here.

The data processing utility 100 includes one or more neural network modules $180_1$-$180_n$, a network training utility (NTU) 140 and an abnormality detection utility (ADU) 160. The data processing utility may also include a data selection utility 120 and a thresholding utility 190. It should be noted that the data processing utility 100 may be preprogrammed to include a predetermined number of NNMs or configured to generate the NNM as data processing structures during operation in a training mode as will be described further below.

It should be noted that in the connection of video surveillance systems and abnormality detection in video streams, the abnormality detection system 10 may generally form a part (or operate in connection with) a video surveillance system/server, being an external abnormality detection unit or a module of the video surveillance system. The abnormality detection system 10 may thus be configured and operable to receive input data pieces indicating object instances from the video surveillance system and process these data piece either in the training mode, for a training period including collection of a training data set of object instances and adjusting operation of the one or more NNMs 180 accordingly, or in the abnormality detection mode for classifying data pieces as normal or abnormal with respect to the appropriate training.

The network training utility 140 (NTU) is configured and operable for training of the one or more neural network modules 180 (NNMs) and the abnormality detection utility 160 (ADU) is configured for operating the one or more NNMs $180_i$ for detecting abnormal data pieces in an input data. Additionally, the thresholding utility 190 is generally operable by either the NTU 140 or the ADU 160 to calculate error values corresponding to a distance between output vectors generated by the one or more NNMs 180 and are associated with input data pieces. It should be noted that generally each of the NNMs $180_1$-$180_n$ is preferably a replicator type neural network module, or any other type of neural network structure which is preferably capable for unsupervised learning mode.

As indicated above, the system 10 may generally operate in a training mode for a certain training period, in order to appropriately train the one or more NNMs 180 to process corresponding data pieces to enable detection of abnormal data pieces. The NNMs are being trained with relevant training data (training data set) to set appropriate weights for internal connections of the NNM which minimize the error over the entire training data set. After the system 10 is trained, it can operate to detect an abnormal data piece in the received input data according to the statistical clusters of training data and the normal behavior map.

Figure 2:
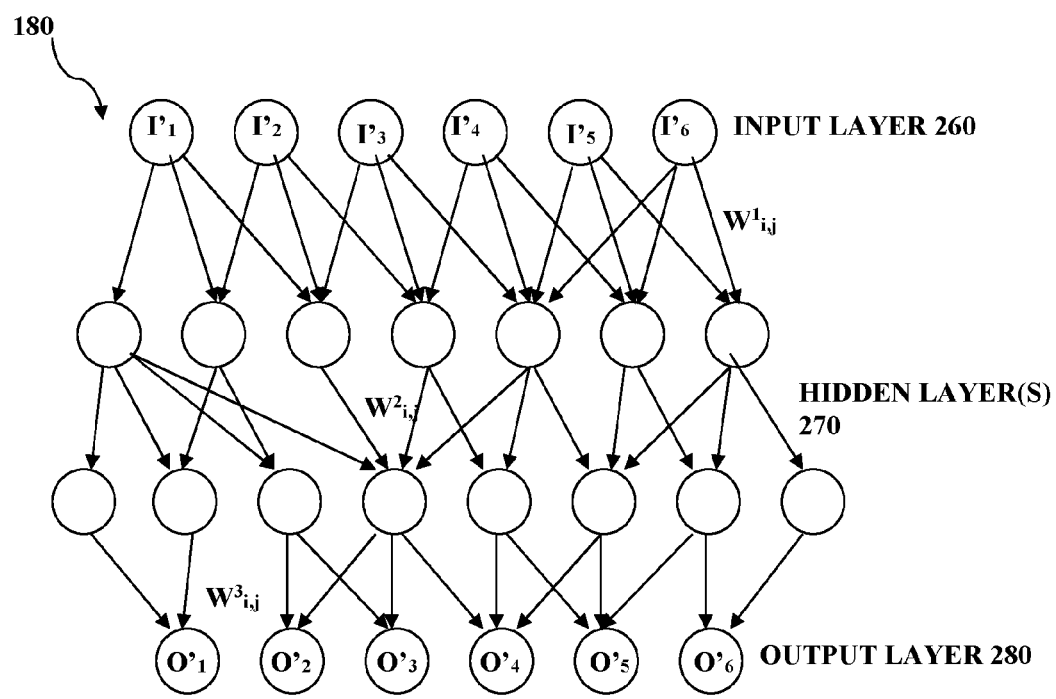
FIG. 2 exemplifies the structure of a replicator type neural network module suitable for use in the present invention.

A schematic illustration of a replicator type neural network module is shown in FIG. 2. This figure illustrates a typical data processing structure of a neural network 180 including an input layer 260, output layer 280 and one or more intermediate layers 270 (two such intermediate layers are shown). Each layer of the neural network includes a certain number of nodes. In the example of FIG. 2 showing a replicator type network, suitable for use with the technique of the present invention, the number of nodes in the input and output layers 260 and 280 are equal, while being different then the number of nodes in the intermediate layers 270. The nodes of each layer are connected to nodes of the neighboring layers and each connection is given a functional weight $W^1_{ij}$ (e.g. certain data processing function). Operation of the network 180 in the training mode includes varying/adjusting the weights between the nodes in accordance with desired outputs corresponding to a training input data set. In a replicator type neural network the desired output vector O may generally be as similar as possible to the corresponding input vector I. The operation of the neural network 180 in its processing mode includes providing an input vector I, such that each of the vector data fields is associated with one of the nodes $I'_1$-$I'_6$ of the input layer 260, i.e. the data in the data fields is being copy/transferred to occupy the associated node of the NNM. The NNM operates to calculate the values of the nodes in the intermediate layers 270 in accordance with the functional weights, and to process/calculate the values of the nodes along the network resulting in calculation of the node values of the output layer 280. The different nodes of the output layer 280 are assigned with the data associated with data fields of an output vector O being the output of the NNM processing.

Referring back to FIG. 1, as shown and according to some embodiments the system 10 includes a data selection utility 120 configured to receive data pieces through the input port 12 and, in the training mode, select the data pieces used for training of the NNMs 180. More specifically, if the input training data set includes a number of data pieces, being higher than a predetermined threshold N*, the data selection utility 120 selects a subset of N* data pieces for training of the one or more NNMs 180. The subset selection may generally be random, but in some embodiments the selection may be based on certain relationship between the selected data pieces. For example, if several data pieces represent collected instances of a single object, the data selection utility 120 preferably selects these data pieces together to be included in the training data set. This allows the system to detect abnormal behavior of objects in the ROI rather than detecting simple statistical variations. It should be noted that the data selection utility 120 may operate to select a subset of training data pieces for training of each of the NNMs 180 in the cascade of one or more NNMs 180 as will be described further below. Further, each of the NNMs 180 may be assigned a similar or different threshold N* on the size of the training data set.

When operating in the training mode, the data selection utility 120 is configured to receive input data pieces and select a training data set which generally represents the actual data behavior/distribution collected during a training period (e.g. collection of object instances in the ROI over a certain amount of time). The data selection utility sends the training data set to the network training utility (NTU) 140 which utilizes it for training of one of the NNMs 180 to thereby adjust data processing by the NNMs 180 accordingly. More specifically, the NTU 140 operates to feed data pieces of the training data set, or a subset thereof, to the NNM 180 and adjust internal processing weights to provide the desired output in accordance with a selected training algorithm (e.g. back propagation algorithm). As indicated above, the training of the NNM is complete when a total difference/error between actual output vectors and desired output vectors is minimized.

In some configurations of the system including a single neural network module 180, the training process may be completed at this stage, i.e. when the neural network module 180 is appropriately trained. In some other configurations including additional neural network modules 180 in a cascade form, the NTU 140 may be configured to verify, after the training process of each of the NNMs 180, if the currently trained NNM is the last NNM of the cascade or not. If there are additional NNMs in the cascade, the abnormality detection system continues to operate in the training mode, and operates to determine additional training data (sub-) set and training of the subsequent NNM, i.e. NNM $180_{i+1}$.

To this end, the NTU 140 operates to verify training of the recently trained NNM to thereby enable selection of additional training data set for training of the subsequent NNM. The NTU 140 inputs data pieces of the training data set to the recently trained NNM $180_i$ and operates the thresholding utility 190 to receive the input training data set and the corresponding output vectors therefrom. It should be noted that in case the training data set is selected from a larger set of collected training data, the entire collected data may be used. The thresholding utility 190 is configured to calculate an error value for each data piece and its corresponding output vector, and to determine a set of data pieces having higher error values with respect to the entire training data set. The thresholding utility 190 thus collects a subsequent training data set which includes the data pieces having high error values (generally higher a certain percentage of the highest error values in accordance with the systems' configurations) for training of the next NNM $180_{i+1}$ in the cascade. The NTU 140 then operates to train the subsequent NNM 180 with a similar technique as described above while using the newly selected training data set including data pieces which received relatively high error values from the previously trained NNM 180.

The training process of the abnormality detection system 10 is complete when any one of the following conditions is met: (i) training of one of the NNMs does not converge, in the meaning the overall training error does not reach a minimal value; (ii) the number of data pieces in a training data set of any one of the NNMs is below a predetermined threshold, indicating insufficient data for appropriate training; or (iii) the number of trained NNMs exceeds a threshold of the number of NNMs in the system, which may be predetermined or selected in accordance with size of the original training data set collected during the training period. When any one of these conditions is met the training process is complete providing a trained cascade of NNM's 180 such that the higher the neural network module in the cascade, it is trained for more common data pieces, while NNM's 180 which are lower in the cascade are trained with respect to relatively rare data pieces. It should be noted that in some embodiments, where the data selection utility 120 selects a subset of N* training data pieces for training of any one of the NNM's 180, the NTU 140 returns to the complete training data set (including all N data pieces) to select therefrom the additional training data pieces for the subsequent NNM.

When the training mode is complete, providing at least one NNM's 180 properly trained, and preferably a trained cascade of NNMs, the system 10 is ready to operate in its abnormality detection mode. It should however be noted that according to some embodiments, the abnormality system may be configured to perform periodic re-training to adapt for variations in input data. Such periodic re-training allows the system to adjust for variations in behavior of input data. For example, in traffic monitoring applications, the abnormality system might need to adjust in the case of changes in traffic due to variations in the rules and/or changes due to constructions. Periodic re-training may be performed automatically in accordance with predetermined conditions in order to deal with variations in behavior in the region of interest. For example, in case that for a predetermined time the number of alerts raised is higher than the desired rate of alerts by 50% or by 100%. Additionally or alternatively, re-training of the system may be initiated by an operator providing an appropriate command.

In the abnormality detection mode, the system 10 is configured for receiving input data pieces and classifying the input data pieces as normal or abnormal with respect to the training of the system 10. To this end, the abnormality detection utility 160 is configured to receive input data pieces through the input connection port 12 and to operate the one or more NNMs 180 for processing of the input data pieces in accordance with the training for abnormality detection. The ADU 160 is thus connected to the one or more NNMs 180 and configured to sequentially provide input data to the cascade of NNMs 180 and to compare the resulting error values to the corresponding abnormality detection thresholds calculated by the thresholding utility to thereby detect whether an input data piece is abnormal or not. As described above, each of the NNMs is configured to process input data pieces to provide corresponding output vectors in response. The thresholding utility 190 may receive the input data pieces and the corresponding output vectors and calculate an error value being a measure to the difference between them. If the error value resulting from operation of any one of the NNMs 180 is below a certain corresponding threshold, the data piece is considered as normal and the detection process stops with respect to this data piece. If the error value provided by a neural network module is higher than the corresponding threshold (which may be determined for each NNM separately and may be affected by the rate of input data) the ADU 160 continues to sequentially feed said data piece to the next NNM of the cascade. If after processing a certain data piece by all of the NNM's 180 the resulting error values are all higher than the corresponding thresholds, the data piece is considered as abnormal. At this point the system may forward an appropriate indication to an operator or for further processing of the input data. For example, a desired rate of alerts may be two alerts per day, if the average number of object instances collected per day is 10,000; the desired event rate is 0.2% of the object instances. The thresholding utility may thus sort the input vectors in descending order according to error values and select the abnormality threshold as the error value of the top 0.2% (top 20 instances) in the list. The top input vectors may also be selected for a subsequent training data set for training of additional NNMs of the cascade.

Generally, in order to enhance operation efficiency of the neural network modules 180, as well as for simplifying calculations, the present technique may utilize scaling of the input data pieces and/or of the error values resulted from processing data by the NNM 180. To this end, the data selection utility 120 may also operate for scaling of input data pieces, both in the training mode and in the abnormality detection mode. The data selection utility 120 may generally utilize the training data set as reference data and calculate statistical parameters thereof which may later be used for scaling the training data pieces as well as for scaling of any input data piece received by the system.

For example, the input data pieces may be processed by the one or more NNMs 180 as vectors I={$I_1, I_2, \ldots I_n$} each including several data fields $I_p$. In the context of detection of abnormal behavior of objects (e.g. in video surveillance), these data fields may represent object instance parameters such as time of instance, location in the frame, speed of object, type of object and other possible characteristics. Each of the data fields p contains certain numerical values representing the corresponding data. The data selection utility 120 may be configured to calculate average and standard deviation of each data field p and utilize these parameters to calculate a scaled vector I' for each input data piece according to the following equation 1;

$$I'_p = \frac{I_p - \overline{I_p}}{\sigma_p} \qquad \text{(equation 1)}$$

here $I_p$ is the p data field in a vector representation of an input data piece I, $\overline{I_p}$ is the average value of the p data field in the training data set, $\sigma_p$ is the standard deviation of the p data field in the training data set and $I'_p$ is the scaled value for the p data field in the scale vector I'.

It should be understood that an object detected in a region of interest, e.g. by an object recognition system, may generate plurality of object instances (data pieces). Generally, a standard video surveillance system may repeatedly locate and/or identify foreground objects in the frame to generate corresponding object instances and thus can track the object behavior over time. Typically, movement of a single object is tracked to periodically generate object instances (e.g. once every 10 seconds) thereby preserving data indicative to its trajectory in the ROI. Although each of the object instances is typically processed separately according to the present technique, a plurality of data pieces associated with trajectory of a similar object enables the system to detect abnormal behavior in the meaning of abnormal trajectories in additional to location, time or type of object.

Figure 3:
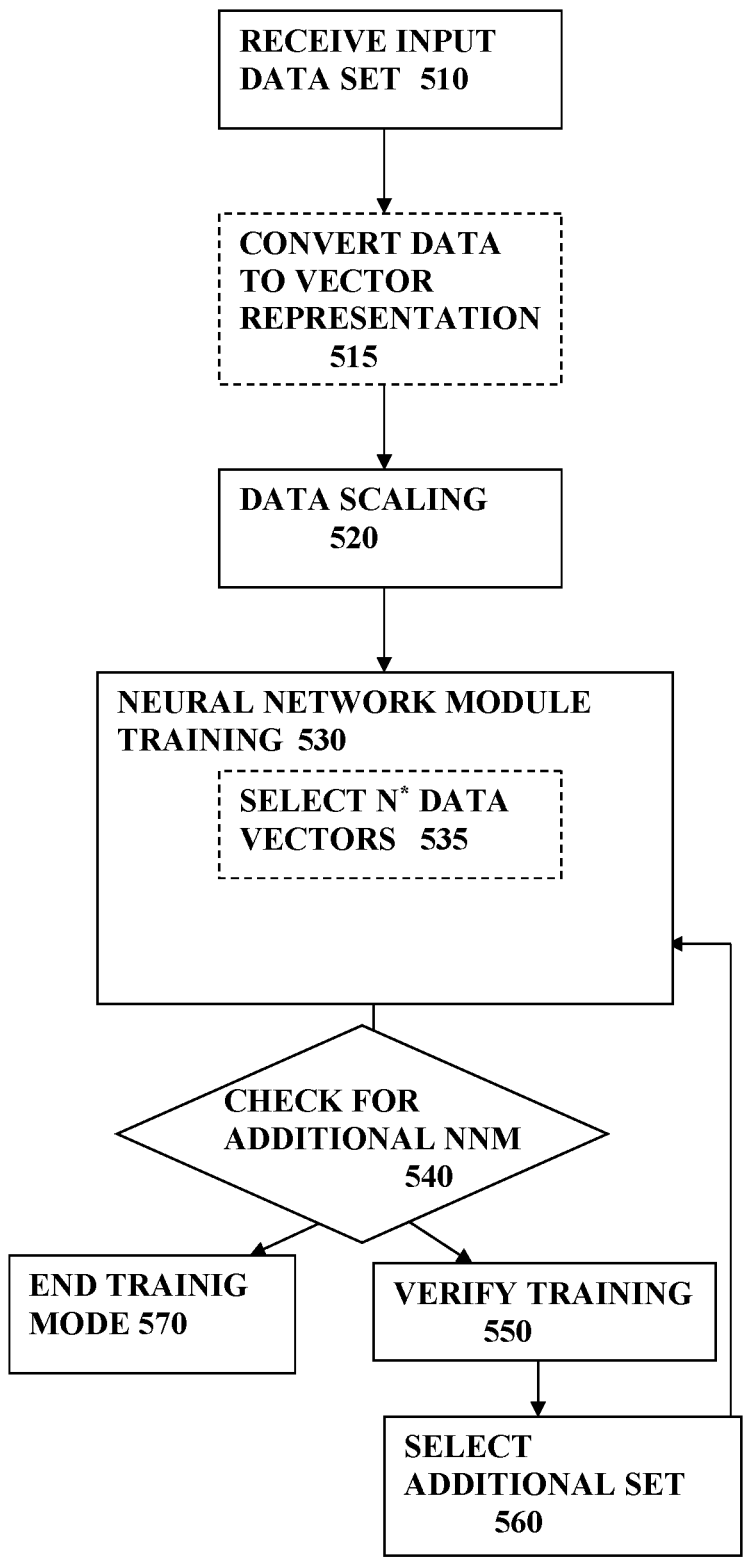
FIG. 3 illustrates operation of the system in its training mode according to some embodiments of the invention.

Reference is made to FIG. 3 exemplifying a flow diagram of the operation of the present technique in its training mode. As shown, the abnormality detection system utility receives input data indicative of a training data set (step 510). The data set may typically include a certain number of data pieces collected during a training period. As indicated above, the training data set generally includes object instances collected from a ROI along a certain amount of time, thereby providing a representation of objects' behavior in the ROI. In case the input data is not in the correct form, the input data may be converted to a set of input vectors (step 515) of a predetermined length, each data field of the input vector represents a certain characteristic of the data piece. For example, an input vector representing an object instance may include data fields such as: $I_{1,2}$=instance time T (which may be in cyclic representation, i.e. $I_1$=cos[T*168/2π] $I_2$=sin[T*168/2π]); $I_{3,4}$=size of object along one or two axes (preferably real size in meters or inches, but size in pixels may also be used); $I_5$, $I_6$=location vector of the object in the ROI or in the frame; and $I_7$, $I_8$=speed of the object along vertical and horizontal axes.

It should be noted that additional data fields may be used, such as object classification (i.e. human, car, animal or any other classification type suitable for the specific operation of the system), instance counter representing how many instances/data pieces were generated for the specific object, etc. The data selection utility may be operated to calculate statistical parameters such as average and standard deviation for each of the data fields in the input data set (step 520). These statistical parameters may be used for scaling of the input data set and are generally also stored is a data storage utility for later use such as scaling of input data during operation in abnormality detection mode.

The input vectors are received by the NTU which operates for training of the one or more NNMs of the system (step 530). It should be noted that the neural network modules may be generated by the processing utility as data processing structures, or preprogrammed being independent processing modules, in any case the system may have a limit to the maximal number of NNMs while some of the NNMs may not be used. If the number N of input vectors exceeds a predetermined threshold for training data set size N*, a subset of N* vectors are selected for training of the corresponding NNM (step 535). As indicated above, it should be noted that the subset of N* vectors is preferably selected randomly, however plurality of object instances which correspond to a single object are preferably selected together to provide effective data processing and enable detection of abnormal behavior of objects. Utilizing the selected training data set, the NTU operates to train the first neural network module by using one of the well-established training algorithms such as back propagation.

When the NNM is trained, i.e. its internal weights have been adjusted to provide a desired input-output correspondence; the NTU may operate to verify if the currently trained NNM is the last level of neural network module in the system or if there are additional untrained NNMs (step 540). If there are additional NNMs to be trained, the NTU operates to verify the training of the current NNM and thus select an additional training data set for subsequent training down the cascade. The NTU operates the currently trained NNM to process the data pieces of the training data set (if N* data pieces were selected, the entire set of N data pieces is now used) to thereby generate corresponding output vectors and calculate error values thereof (STEP 550). The output vectors O are compared to the corresponding input vectors I' for calculation of corresponding error values. For example, the error value may be calculated as follows:

For each data field p of each pair of input-output vectors, the distance $\epsilon_p = |I'_p - O_p|$ is calculated; additionally the averages and standard deviations of the distances $\epsilon_p$ are calculated for each data field p and for all of the input-output pairs of data pieces. Calculation of the average and standard deviation values of the distance is shown in the following equations 2 and 3:

$$\overline{e'_p} = \frac{\sum_{}^{T} |I'_p - O'_p|}{T} \quad \text{(equation 2)}$$

$$\sigma e'_p = \sqrt{\frac{\sum_{}^{T} (|I'_p - O'_p| - \overline{e'_p})^2}{T}} \quad \text{(equation 3)}$$

here T is the number of data pieces currently processed (in the first stage T=N).

The total error value E may generally be calculated for each vector (data piece or object instance) separately based on the global statistical parameters calculated above, calculation of the total error E value may be as exemplified in the following equation 4:

$$E = \sum_{i=1}^{P} \frac{|I'_i - O'_i|}{\sigma e'_i} \quad \text{(equation 4)}$$

When the total error values E for the set of vectors are calculated, the thresholding utility may select a group of high error data pieces, i.e. having total error value higher than a predetermined threshold or a group of certain percentage (or certain number) of data pieces having higher error values for training of additional NNMs in the cascade. If the number of high error value vectors is lower than certain threshold (e.g. less than 100 vectors) representing a minimal number of data pieces sufficient for appropriate training of an NNM, the training process may end.

As indicated above, according to some embodiments, the threshold for selection of further training data sets may be determined in accordance with a rate of input data as received by the system or as collected during the training period to thereby enable a control over a rate of alerts generated by the system 10. It should be noted that the alert rate provided by the system may vary with respect to the number of active NNMs which is selected as the desired rate of alerts divided by the rate of input data. Thus, the threshold value for each desired event rate may be selected as the error of the input vector at position (error rate*number of input vectors) in a sorted list including the error values for the training data set. For example, if the desired abnormality detection rate (desired rate of alerts about events) is m events per day, and the training data set was collected through a training period of D days (assuming that the number of events per day is large enough). According to this example, the abnormality detection threshold for a single NNM is set in accordance with the error value of the $$\left(T - \frac{T}{m \times D}\right)_{th}$$

element, after verifying the training of the NNM.

In some embodiments, where the system operates with more than one NNM, the total abnormality detection threshold should be of the same value; however the thresholds for the different NNMs of the cascade are selected separately in accordance with statistical distribution of the error values during the training mode. For example, if the desired abnormality rate is 0.1% of all objects and there are two NMMs in the cascade then each of the NMM's thresholds will be set to 1% to thereby provide the total abnormality detection threshold to be 1% *1% =0.1% and in a similar manner for higher number of NNMs. It should be noted that the abnormality threshold for different NNMs of the cascade need not be equal and the threshold may vary in accordance with size of the associated training data set and/or variations of error values.

Thus a new (sub-) set of training data is selected by the NTU for sequential training of the next NNM in the cascade (STEP 560). To this end the abnormality detection system 10 may operate the NTU 140 for training the NNMs in a loop such that in each iteration (i.e. training of one of the NNMs) a subset of training data pieces (training vectors) is selected and the current NNM is trained. Then the training of the NNM is verified to calculate error values, and continues to the next iteration for training the next NNM. As indicated above, the training loop ends when any one of the following conditions is met: (i) the number of trained NNM reaches a maximal number of NNMs threshold, in this connection it should be noted that the NNMs themselves may be preprogrammed into the system or generated during the training mode process; (ii) training of any one of the NNMs does not converge, this means that the training data set is too scattered and/or there are not enough clusters of data pieces (object instances) showing similar behavior; (iii) the number of data pieces in a training data set at any stage is below a predetermined threshold for training, this means that there is no sufficient amount of data to perform meaningful training of the sequential NNM.

Once the training process ends (step 570), due to any one of the above conditions, the NTU may operate to store the required data for later use (e.g. statistical parameters of input data pieces and of error values) and to provide an appropriate alert that the training process has completed successfully. The alert may include various data indicative of the training process and may include statistical parameters indicating significance of error value and corresponding threshold. After generating the alert, an operator may shift the system to its abnormality detection mode. Additionally or alternatively the NTU may cause the system to automatically shift to its abnormality detection mode and to be responsive to input data pieces by classifying such data pieces as normal or abnormal with respect to the training.

In the abnormality detection mode, the system is configured to receive input data pieces and to classify these data pieces as normal or abnormal with respect to the system's training. It should be noted that the abnormality system generally utilizes statistical distribution of input data pieces received during the training mode (training data set) to form clusters of similarly behaving data pieces which define a normal behavior map. This is while data pieces which do not fall into clusters are generally classified as abnormal. In the context of video processing and surveillance systems, the abnormality classification rely on the inventors' understanding that most alert raising events are different than behavior of a typical object in a ROI. By clustering sufficient amount of data indicative of objects' behavior in the ROI, normal behaving objects/events will fall into well-established clusters while events that may require further attention are abnormal and do not fall into any of the clusters.

Figure 4:
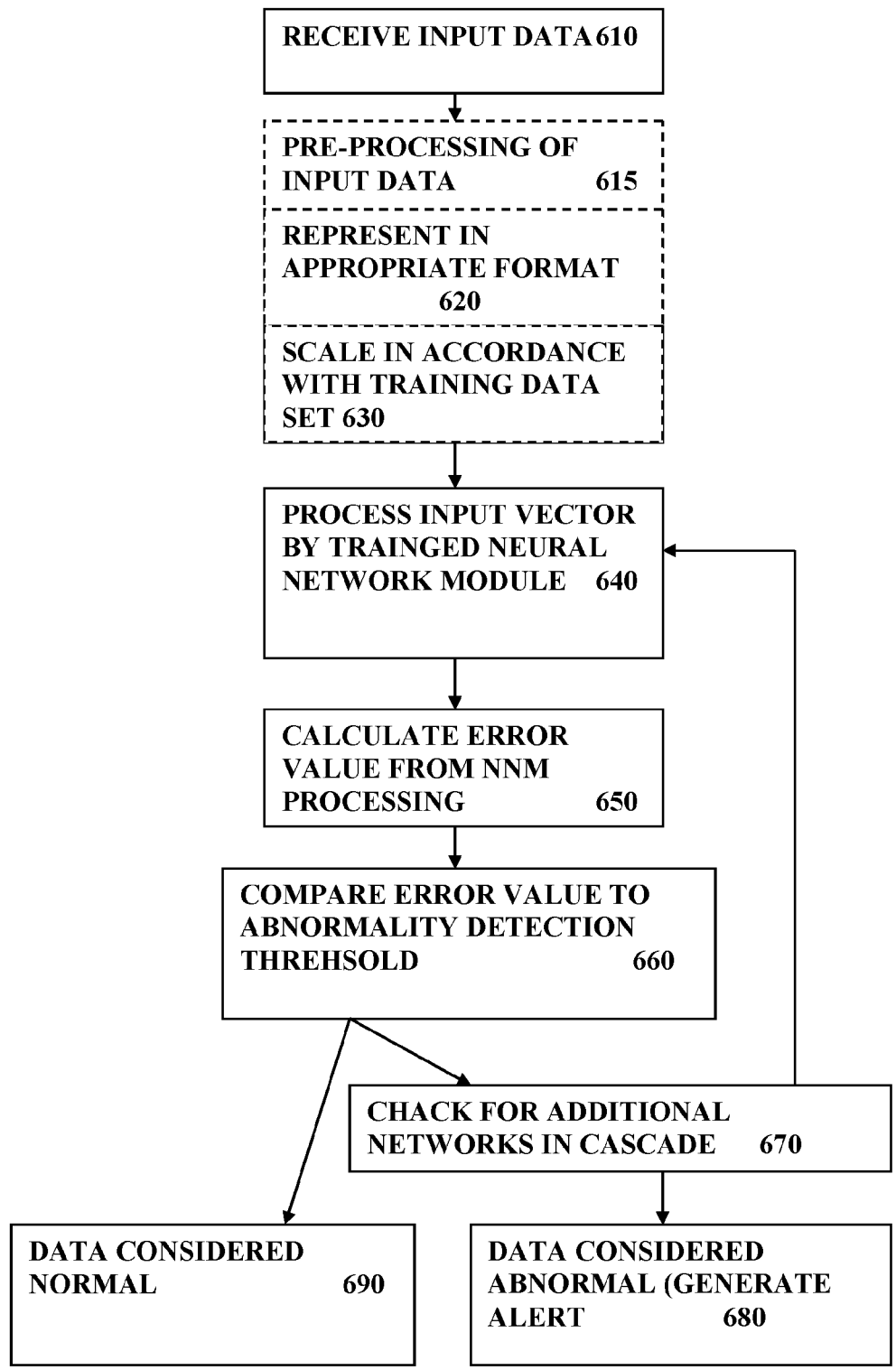
FIG. 4 illustrates operation of the system in its abnormality detection mode according to some embodiments of the invention.

The basic steps of the abnormality detection mode are exemplified in FIG. 4 in a way of a flow diagram. During the system's operation in the abnormality detection mode, it is configured to receive input data pieces and classify these data pieces are normal or abnormal based on the system's training. More specifically, the system receives input data pieces to be processed via the input port (step 610) and the data selection utility may apply certain pre-processing to the input data (step 615). Such pre-processing may include data verification, i.e. verifying if the data is of the correct form and/or if the data pieces include operation commends other the data to be classified. According to some embodiments, the rate of input data is monitored during operation in detection mode to vary abnormality threshold accordingly to provide control over a rate of alerts generated by the system. If not provided in the correct format, the input data pieces are converted to be represented in an appropriate vector form (step 620) and scaled in accordance with statistical parameters of the training data set (step 630). The scaled vectors $I'_p$ are then processed (generally each vector separately) by the first NNM (step 640) which is trained to generate a replica of the input vector, i.e. output vector $O'_p$. The input and output vectors are compared to calculate an error value indicating a difference between them, thus indicating connection of the input vector to clusters of data from the training data set (step 650). The error value may be determined based on the above described equation 4, where $I'_p$ and $O'_p$ are the input and output vectors and $\sigma e_p$ is the standard deviation of error values as calculated during the training process. The calculated error value is compared with a corresponding abnormality error thresholds determined in the training mode for the first NNM (step 660) If the error value is below the corresponding abnormality error thresholds the data piece is classified as normal and its processing ends (step 690).

If the calculated error value associated with an input data piece exceeds the corresponding abnormality error thresholds, processing of said data piece may continue along the cascade of NNM to verify abnormality thereof. Generally, the system checks if there are additional NNMs down the cascade (step 670) and if there are sequential NNMs, the input vector $I'_p$ associated with the currently processed data piece is transferred to be processed by the subsequent NNM in the cascade, i.e. back to step 640. Thus, processing of the said input data piece returns to step 640 where it is being processed by the sequential NNM of the cascade. If after processing by any of the NNM of the cascade the input vector is classified as normal, i.e. the corresponding error value is below the abnormality error thresholds associated with the current NNM, the processing ends by classifying the input data piece as normal. Alternatively, if the input data piece is classified as abnormal by all of the NNMs of the cascade, it is considered as abnormal data piece and an appropriate alert may be generated (step 680).

It should be noted that operation of the abnormality detection system described above in a video analysis system provides a capability for automatic detection of various data pieces representing object instances and/or events. Generally the present technique, and abnormality detection system, provides for automatic generation of a normal behavior map describing which events are normal and should not raise any alarm, and which events might require further operations based on the ability of the system to adjust weight factors to replicate the training data set. Additionally, it should be noted that the abnormality error thresholds associated with each of the NNMs of the cascade may be selected in accordance with a rate of input data as receive during the training mode, and may also be updated during operation in detection mode. This provides the system with an ability to select a maximal/minimal rate of alerts indicating abnormal events based on operational considerations.

Figure 5:
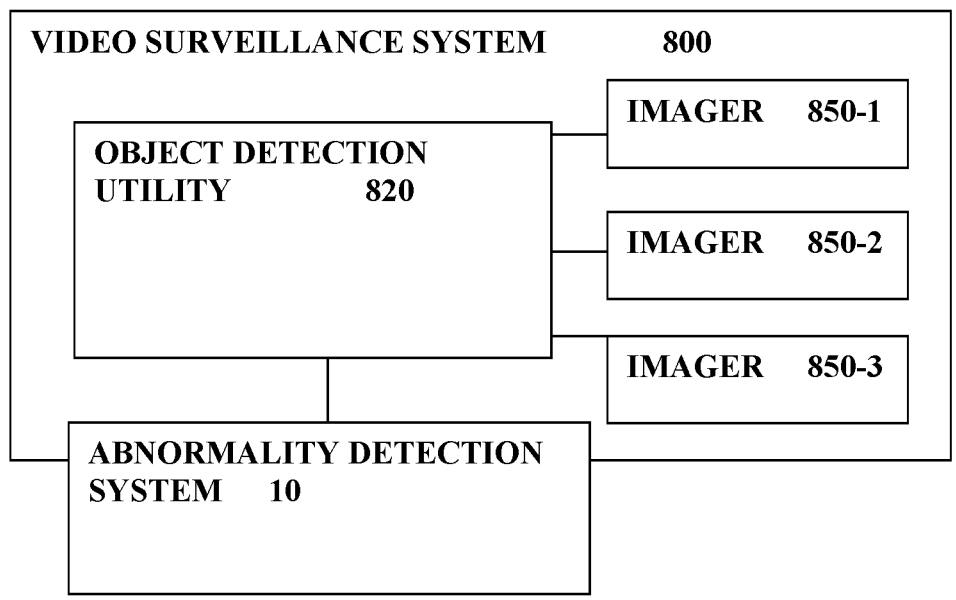
FIG. 5 illustrates an example of a video surveillance system utilizing the abnormality detection system of the invention.

Reference is made to FIG. 5 illustrating an example of a use of the abnormality detection system 10 of the invention. As shown, a video surveillance system 800 including one or more imagers (three such imagers 850-1 to 850-3 are shown) and an object detection utility 820 may be connected or include the abnormality detection system 10 of the present invention. Generally, the video surveillance system 800 includes one or more processing utilities, storage utilities and input/output ports configured and operable for performing the relevant operational tasks. Additionally, the video surveillance system may include additional modules/utilities which are not specifically shown, such as various processing utilities, storage utilities, communication utilities as well as input and output ports and/or display. The one or more imagers 850 are located in a region of interest and configured to generate image data of the region of interest and transmit the image data to further processing by the video surveillance system 800. Generally, the object detection utility 820 is configured and operable for processing the image data and extracting foreground objects therefrom to thereby enable processing of object related information. As described above, the object detection utility may generate object instances including various detail regarding detected foreground objects such as type of object, location, speed and/or other object related parameters. The object detection utility 820 is connected to the abnormality detection system 10, directly or via other data processing modules as the case may be, for transmitting extracted object instances thereto for detection of abnormal events in the region of interest. As described above, the video surveillance system 800 is typically operated for training of the abnormality detection system 10 for a certain training period and after the training period; the system is ready to detect abnormal events on the region of interest based on data collected during the training period.

The collected data pieces (e.g. object instances) may be stored in a storage utility for further use, and may also be transmitted directly to the abnormality detection system 10. Generally, during the training period, the collected object instances are stored during the period (e.g. a week or two) and when a sufficient amount of data have been collected, the data is transmitted to the abnormality detection unit 10 as a training data set. During operation in abnormality detection mode (i.e. normal operation of the surveillance system 800) the video surveillance system 800, and especially its object detection utility 820, operate to transmit the collected object instances to the abnormality detection system 10 in real time, or once every certain predetermined period of collection. Additionally, the object detection utility 820 may operate to store collected object instance in a storage utility for control (e.g. quality control) and for periodic re-training of the abnormality detection system as noted above.

For example, video surveillance system 800 may be configured to monitor traffic in a certain road. The video surveillance system 800 monitors the image streams collected by the one or more imagers 850 from the region of interest, and operates the object detection utility 820 to detect objects in the image stream (e.g. cars). Every second the object detection utility 820 generates object instances for each detected object which include such parameters as time of day, position, speed and direction of movement.

Training data may be collected over a training period of one or two weeks and thus a set of about 10,000 vehicles is collected. Each vehicle may be observed for a certain time and thus generate an average of 10 associated object instances, thereby providing the total training data set to include 100,000 object instances (input vectors). This collected input data is used for training the first NMM, and after the training is complete the entire training data set is run through the NMM to calculate the error for each input and the resulting errors are sorted from lowest to highest. In this example the desired detection rare is set to 2 events per day and an object is set to be considered abnormal if at least 2 of its instances are above the error threshold. Therefore out of 100,000 instances collected during the training period of one week, a number of 21 instances are to be over the abnormality detection threshold (2 objects×2 instances×7 days). The error threshold is elected as the value of the $22^{nd}$ member from the end of the error vector (generated by a list of the data pieces arranged in descending order of error values). Object instances that are likely to exceed this error threshold will typically include behaviors such as: (i) appearing at a time when few or no objects were observed during the training period; (ii) moving in a direction that is significantly different than what was observed during the training period (generally driving against traffic); and/or (iii) moving at a speed that is significantly higher than what was observed during the training period. It should be understood that the technique of the present invention may also detect other abnormal events or abnormal object instances by training on a large data set. As described above, the technique of the present invention actually generates the abnormality detection rules during its operation in training mode and does not require an input of detection rules which may be missing other abnormal event that might occur.

Thus the present invention provides a technique for detection of abnormal data pieces in a data stream. The present technique is capable of automatically generating a normal behavior map while being robust and unaffected by variation of size and/or distribution of the data pieces. Those skilled in the art will readily appreciate that various modifications and changes can be applied to the embodiments of the invention as hereinbefore described without departing from its scope defined in and by the appended claims.

The invention claimed is:

1. A method for use in abnormality detection, the method comprising:
providing a plurality of neural network modules; and
sequentially training said neural network modules in a cascade order with respect to a set of training data pieces to thereby reduce an error value for each successive neural network module, thereby minimizing an error value with respect to said training data pieces for each successive neural network module in the cascade;
wherein said sequentially training comprising:
a. providing a first set of calibration data pieces and generating therefrom a first normal behavior map corresponding to said first set of calibration data,
b. determining a second set of calibration data pieces which includes calibration data pieces of said first set of calibration data pieces being outside of said first normal behavior map,
c. using said second set of calibration data pieces and generating a corresponding second normal behavior map corresponding to said second set of calibration data,
d. determining a third set of calibration data pieces including calibration data pieces being outside of said second normal behavior map,
e. repeating the process until number of calibration data pieces in a newly generated set satisfies at least one of the following: the number equals to number of calibration data pieces in previous set, or the number is below a predetermined threshold.

2. The method of claim 1, comprising producing for each set of calibration data pieces a corresponding set of input vectors and scaling said set of input vectors with respect to mean and standard deviation values of at least one parameter of said input vectors.

3. The method of claim 1, comprising: receiving input data pieces in which abnormalities are to be detected, comparing said input data pieces to the first normal behavior map and classifying said input data pieces as either normal or abnormal with respect to said first behavior map, and electively applying a comparison step to the abnormal data pieces, said selective comparison step comprising comparing the abnormal input data pieces to the second behavior map to further classify said abnormal input data pieces as either normal or abnormal with respect to the second behavior map, and repeating the selective comparison step until all the input data pieces are classified as normal, and upon identifying that there exist at least one input data piece classified as abnormal with respect to all behavior maps, generating data indicative of said at least one abnormal input data piece.

4. The method of claim 1, wherein said generating of a normal behavior map comprising utilizing a neural network based on a set of data pieces.

5. The method of claim 1, wherein said data pieces comprise object related data pieces, generated from an image stream.

* * * * *